(12) United States Patent
Shackle

(10) Patent No.: US 9,723,671 B2
(45) Date of Patent: Aug. 1, 2017

(54) AC-POWERED LED LIGHT ENGINE

(71) Applicant: Peter W. Shackle, Rolling Hills Estates, CA (US)

(72) Inventor: Peter W. Shackle, Rolling Hills Estates, CA (US)

( * ) Notice: Subject to any disclaimer, the term of this patent is extended or adjusted under 35 U.S.C. 154(b) by 0 days.

(21) Appl. No.: 15/130,033

(22) Filed: Apr. 15, 2016

(65) Prior Publication Data

US 2016/0234898 A1   Aug. 11, 2016

Related U.S. Application Data

(62) Division of application No. 14/595,565, filed on Jan. 13, 2015, now Pat. No. 9,491,821.

(60) Provisional application No. 61/940,830, filed on Feb. 17, 2014, provisional application No. 62/034,540, filed on Aug. 7, 2014, provisional application No. 62/041,192, filed on Aug. 25, 2014, provisional application No. 62/056,591, filed on Sep. 28, 2014.

(51) Int. Cl.
*H05B 33/08* (2006.01)

(52) U.S. Cl.
CPC ....... *H05B 33/0821* (2013.01); *H05B 33/083* (2013.01); *H05B 33/0809* (2013.01); *H05B 33/0812* (2013.01); *Y02B 20/42* (2013.01)

(58) Field of Classification Search
None
See application file for complete search history.

(56) References Cited

U.S. PATENT DOCUMENTS

| | | | | |
|---|---|---|---|---|
| 5,747,941 A | * | 5/1998 | Shackle | H05B 41/2985 315/209 R |
| 6,137,239 A | * | 10/2000 | Wu | H05B 41/245 315/291 |
| 6,150,771 A | | 11/2000 | Perry | |
| 6,420,838 B1 | * | 7/2002 | Shackle | H05B 41/2851 315/209 R |
| 7,138,770 B2 | | 11/2006 | Uang et al. | |
| 7,489,086 B2 | | 2/2009 | Miskin et al. | |
| 7,791,285 B2 | | 9/2010 | Wu | |
| 8,148,905 B2 | | 4/2012 | Miskin et al. | |
| 8,177,390 B2 | | 5/2012 | Miskin | |
| 8,179,055 B2 | | 5/2012 | Miskin et al. | |

(Continued)

OTHER PUBLICATIONS

Tan et al., "A Driving Scheme to Reduce AC LED Flicker", Proc. of SPIE vol. 8835, 883500, 2013 SPIE, pp. 1-6.

*Primary Examiner* — Crystal L Hammond
(74) *Attorney, Agent, or Firm* — Wendy W. Koba

(57) ABSTRACT

AC LED light engines powered directly from the AC power line contain circuitry of resistors, capacitors, diodes and transistors which enables a single string LEDs connected to series to efficiently produce light with a relatively low level of flicker as perceived by the human eye. The LEDs are driven by a current which is alternately capacitively-limited and resistively-limited. Capacitively-limited pulses of current are interposed between resistively-limited pulses of current so that the resulting output current ripple is at frequencies of 240 Hz or above which the human eye cannot perceive. The combination of resistively-limited current and capacitively-limited current results in a current drain from the power line which is generally sinusoidal and can have a power factor in excess of 0.70.

3 Claims, 14 Drawing Sheets

(56) References Cited

U.S. PATENT DOCUMENTS

| | | |
|---|---|---|
| 8,314,565 B2 | 11/2012 | Burdalski et al. |
| 8,373,363 B2 | 2/2013 | Grajcar |
| 8,384,299 B1 | 2/2013 | Burdalski et al. |
| 8,395,332 B2 | 3/2013 | Lee et al. |
| 8,531,118 B2 | 9/2013 | Miskin et al. |
| 8,569,961 B2 | 10/2013 | Lee et al. |
| 8,598,799 B2 | 12/2013 | Tai et al. |
| 8,648,539 B2 | 2/2014 | Miskin et al. |
| 8,766,550 B1 | 7/2014 | Yoon et al. |
| 9,192,005 B2 | 11/2015 | Beland et al. |
| 9,516,722 B2 * | 12/2016 | Sadwick ............ H02M 1/4266 |
| 2007/0273299 A1 | 11/2007 | Miskin |
| 2008/0018261 A1 | 1/2008 | Kastner |
| 2008/0116816 A1 | 5/2008 | Neuman |
| 2010/0102336 A1 | 4/2010 | Lee |
| 2010/0123403 A1 * | 5/2010 | Reed ................ H05B 33/0815 315/193 |
| 2010/0295458 A1 | 11/2010 | Cheng |
| 2010/0308738 A1 | 12/2010 | Shteynberg |
| 2010/0308739 A1 | 12/2010 | Shteynberg |
| 2011/0018449 A1 | 1/2011 | Lan et al. |
| 2011/0089851 A1 | 4/2011 | Lee et al. |
| 2011/0309760 A1 | 12/2011 | Beland |
| 2012/0049742 A1 | 3/2012 | Lee et al. |
| 2012/0081009 A1 | 4/2012 | Shteynberg |
| 2012/0106216 A1 | 5/2012 | Tzinker |
| 2012/0133289 A1 | 5/2012 | Hum |
| 2012/0153833 A1 | 6/2012 | Mikani |
| 2012/0161656 A1 | 6/2012 | Lee et al. |
| 2012/0217902 A1 | 8/2012 | Yang |
| 2012/0262075 A1 | 10/2012 | Lynch |
| 2012/0299489 A1 | 11/2012 | Sakuragi |
| 2013/0027905 A1 | 1/2013 | Lee et al. |
| 2013/0033177 A1 | 2/2013 | Rooljackers |
| 2013/0043799 A1 | 2/2013 | Siu et al. |
| 2013/0099687 A1 | 4/2013 | Zhang |
| 2013/0200802 A1 | 8/2013 | Sakuragi |
| 2013/0293122 A1 | 11/2013 | Huynh |
| 2014/0015441 A1 * | 1/2014 | Radermacher ..... H05B 33/0809 315/294 |
| 2014/0028203 A1 | 1/2014 | Pan et al. |
| 2014/0167634 A1 | 6/2014 | Ivankovic |
| 2014/0191672 A1 | 7/2014 | Stack |
| 2014/0265894 A1 | 9/2014 | Weaver |
| 2015/0042234 A1 | 2/2015 | Lee et al. |
| 2015/0257222 A1 | 9/2015 | Siessegger |

* cited by examiner

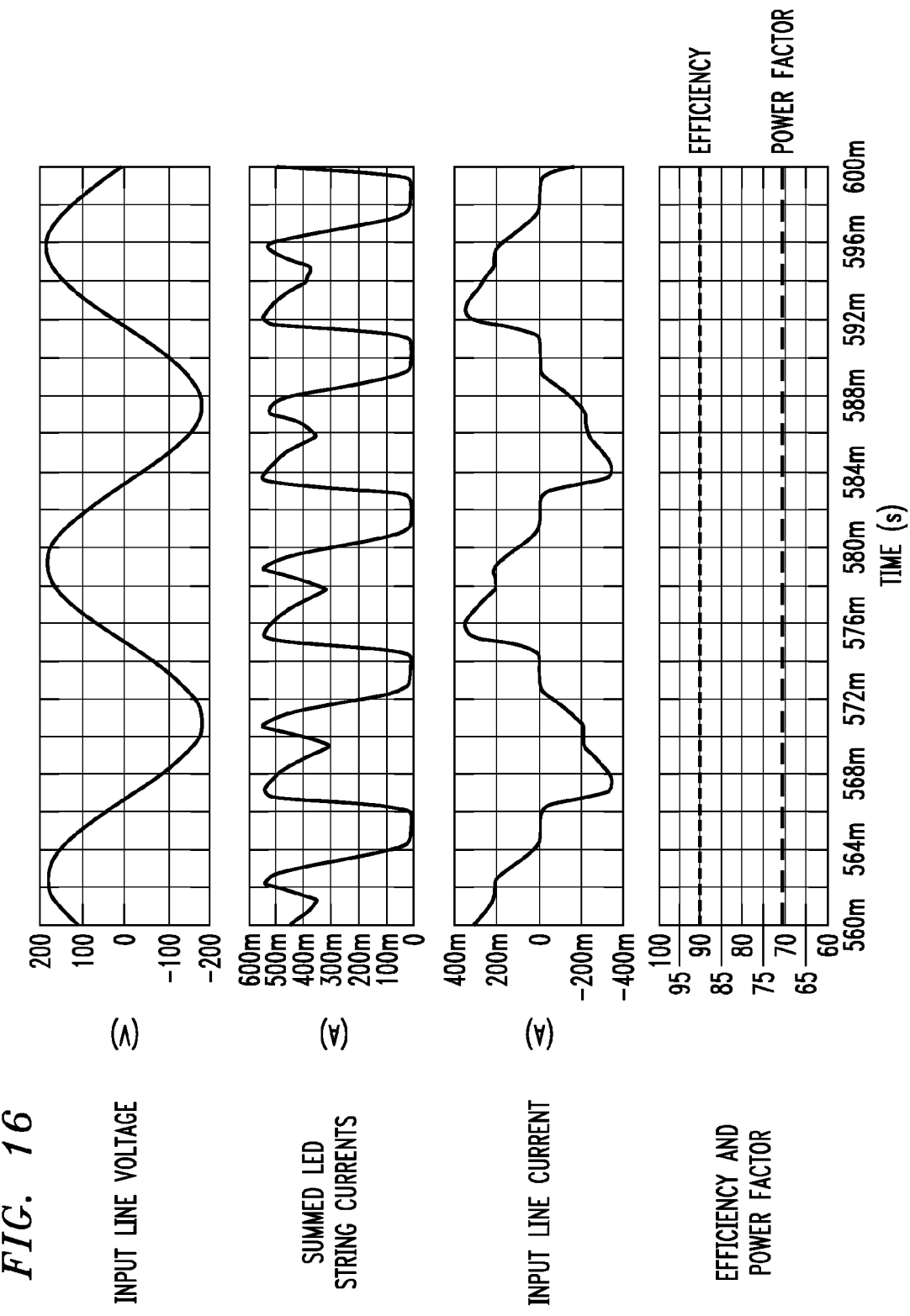

AC-POWERED LED LIGHT ENGINE

CROSS-REFERENCE TO RELATED APPLICATIONS

This application is a divisional of U.S. application Ser. No. 14/595,565, filed Jan. 13, 2015, which claims the benefit of the following U.S. Provisional Applications: Ser. Nos. 61/940,830 (filed Feb. 17, 2014), 62/034,540 (filed Aug. 7, 2014), 62/041,192 (filed Aug. 25, 2014), and 62/056,591 (filed Sep. 28, 2014), all of these applications herein incorporated by reference.

BACKGROUND OF THE INVENTION

Field of the Invention

The invention relates in general to an alternating current (AC)-powered light emitting device (LED) arrangement, and more particularly to an AC-powered LED light engine that is capable of producing light output with relatively low flicker while providing the desired high light emitting efficiency and power factor criteria.

Description of the Related Art

So-called AC LED diode products have become popular because one relatively small, flat module can be joined directly to an AC power line and will produce light suitable for many common illumination purposes. The very first such products consisted of LEDs mounted in antiparallel pairs, with as many as forty such pairs connected in series. Typically, a resistor was placed in series with such an arrangement to provide a more constant (and less voltage sensitive) light output. Such a prior art arrangement is shown in FIG. 1. Later, it was found to be more economical to use a string of single diodes in place of the anti-parallel pairs, still with a limiting resistor (or later a current-controlled resistor). In this configuration, a bridge rectifier was also required to be connected between the two ends of the string and the AC power line. This type of prior art arrangement is shown in FIG. 2.

One weakness of such products was that the light was only produced at the peak of the AC power line, when the instantaneous power line voltage exceeded the sum of the forward voltages of the LEDs. This short duration flash, repeated at 120 Hz, could cause stroboscopic effects and for some vulnerable persons might even induce epileptic seizures. Technology was then developed in the form of integrated high voltage switch arrays that were used to sense the AC line voltage, and to cause shorting switches to be closed across suitable numbers of the LEDs so that the sum of the forward voltages of the unshorted LEDs at each point in the power line cycle roughly matched the instantaneous power line voltage. A schematic of a typical prior art product of this kind is shown in FIG. 3. These products have proven popular because they draw a power line current which is roughly sinusoidal in phase with the power line voltage, resulting in power factor and total harmonic distortion (THD) numbers that are pleasing to the utility companies, while driving the LEDs with a net current that is roughly a half sine wave waveform. Therefore, instead of the intense light flash at the peak of each power line half cycle, the light production (which is proportional to the total LED current) rises smoothly to a peak during a power line half cycle and then declines again smoothly to zero before the next power line half cycle.

However successful these products have been, they have not found application in the most demanding applications—such as task lighting, workshop lighting and office lighting. This lack of success is due, at least in part, to the fact that there is still a residual stroboscopic effect in these switch-controlled arrangements. Although not noticeable by most people most of the time, this effect can produce headaches and eye strain if these light sources are used in these task, workshop and/or office light applications (among others). This fluctuation of the light at 120 Hz is often referred to as "flicker" in the lighting industry. The conventional definition of flicker is the fraction of the minimum point in the LED current waveform in terms of the maximum ($I_{max}$) and minimum ($I_{min}$) current levels in the waveform, thus:

$$\text{flicker} = (I_{max} - I_{min})/(I_{max} + I_{min}).$$

This definition is useful for low frequency sinusoidal fluctuations in a waveform. However, defining flicker in this fashion may not relate well to the perception of the human eye when extremely rapid fluctuations are present. The human eye cannot perceive any fluctuations at more than 120 Hz frequency, and even at 120 Hz the perception is marginal. Therefore, when high frequency fluctuations are present, the conventional definition of flicker does not comport to the perception of the human eye. In particular, if tiny notches of 2 msecs or less are taken out of an LED current waveform, the human eye cannot react fast enough to notice them. This is why high frequency pulse width modulation of LED current is used to produce the perception of dimming of LED light.

It is clear from the foregoing that there is a need for an AC-driven LED light engine that can produce light with low flicker to please consumers, while still having all the attractive features of the existing AC LED lights. A clue to the direction from which such a circuit might come was discussed in a paper entitled "*A Driving Scheme to Reduce AC LED flicker*" by Tan and Narendran, presented at the 2013 SPIE meeting in San Diego. This paper came to the conclusion that flicker could be minimized by the combination of capacitive and resistive drive to LEDs. However, the authors merely describe a parallel combination of a pair of bidirectional LED strings, the activation of one string of LEDs being resistively limited and the activation of the other, parallel string of LEDs being capacitively limited. The Tan et al. paper does not provide a practical engineering solution as to how this could be done.

As described in the Tan et al. paper, the circuit presented will require either twice or four times the number of LEDs as the various configurations of the present invention described hereinbelow. If the AC LEDs proposed by Tan et al. were replaced with LED strings enclosed by bridge rectifiers, fewer LEDs would be required, but the gap between light outputs from each half cycle becomes a major disadvantage. U.S. Pat. No. 8,569,961 issued to Lee et al. on Oct. 29, 2013 presents a circuit based upon both resistive and capacitive coupling, with a principle using cross-coupled capacitors, but again requires twice as many LEDs as the present invention.

SUMMARY OF THE INVENTION

While not intending to limit the scope of the claims or disclosure, in brief summary, the present disclosure and claims are directed towards an AC-driven LED light engine which produces light output with relatively low flicker, high efficiency and high power factor.

The present invention provides an AC LED drive circuit which uses a minimal number of LEDs and provides both high efficiency power conversion and either continuous light output or minimal gaps between light outputs from successive power line half cycles, resulting in low flicker at 120 Hz, and a nearly sinusoidal power line current. One embodiment of the invention as described in detail below exhibits a power factor greater than 0.70.

Four different embodiments of the invention are described. They all share the general concept that resistively-limited current passes through LEDs at the peaks of the power line voltage waveform, and in between these peaks, capacitively-limited current is passed through some of these same LEDs so that the peak light output from the capacitively-limited current is comparable to the peak light output from the resistively-limited current. The net result is that the LED ripple current is transformed from being a 120 Hz phenomenon (to which the human eye may react at times) into a 240 Hz (or higher) frequency, which the human eye cannot perceive. The AC LED current can be continuous in some of the embodiments and a power factor greater than 0.7 is achieved in at least one configuration of one embodiment of the present invention.

Disclosed and claimed in a first embodiment is an LED circuit in which the LEDs are arranged in one continuous string, subdivided for reference into four parts, designated as substrings A through D from the positive end to the negative end. Substrings A and B are operated primarily during positive power line voltage half cycles (and thus referred to at times as "the positive substrings"), while substrings C and D are operated primarily during power line negative half cycles ("the negative substrings"). During the first part of a positive power line half cycle, segment B is driven into conduction (i.e., illuminated) by displacement current through capacitors (the "capacitively-limited" current), and then starting near the peak of the positive power line voltage half cycle, both substrings A and B are illuminated via current that is resistively-limited from the power line (galvanic current). Before the end of the positive power line half cycle, substring C starts conducting displacement current from a capacitor which was precharged during the previous half cycle. As before, close to the peak of the negative voltage half cycle, substring D is illuminated by virtue of conducting resistively-limited current (galvanic current) directly from the power line. In this manner, the current through substring B is first capacitively limited (displacement current) and then resistively limited (galvanic current). The same follows (during the opposite half cycle) for substring C. With repetition of this cycle, LED light continues to be produced at a relatively uniform level, with only two brief near zero output points per power line cycle.

Disclosed and claimed in a second embodiment is an arrangement using the same basic circuit as the first embodiment, but wherein solid state switches are incorporated so that substring B is shorted out when substring A has started conducting, and substring C is shorted out when substring D has started conducting. In this way, the resistively-limited conduction period is extended to overlap with the subsequent capacitively-limited operation. So-called "dead periods" are essentially eliminated in this embodiment and the current drawn from the power line is more nearly in phase with the power line voltage, improving the power factor while the total LED current remains relatively constant. The power factor of an AC circuit is typically defined as a ratio of actual power dissipated by the circuit to the product of its rms voltage and rms current. The power factor is generally used as a way to measure how efficiently the AC voltage line power is being used.

Disclosed and claimed in a third embodiment is a circuit in which two substrings of LEDs are connected to the power line by a capacitor at their common point. This capacitor drives these two substrings like a charge pump, first pulling charge out of the one substring and then pushing it into the other substring. A full bridge rectifier, connected to the power line, has its output joined to the two ends of the substrings through resistors. Therefore, at the peak of the power line voltage waveform, the resistively-limited current (galvanic current) passes through both substrings. In this manner, the LED current is continuous and the ripple current which is present is primarily at a frequency of 240 Hz or higher. The number and cost of the LEDs used in this embodiment may be reduced when compared to the first two embodiments, as a result of including a full bridge rectifier (i.e., only a "positive" substring pair is required for use with the rectified current).

Disclosed and claimed in a fourth embodiment is a circuit containing three sequential strings of LEDs (denoted as α, β and γ) connected to a full bridge rectifier through resistors at either end, similar to the third embodiment. In this particular fourth embodiment, capacitors are directly connected between the respective ends of the LED string and the AC power line. Diodes connect between the incoming power line to between substrings α and β, as well as between substrings β and γ. LED current consists first of displacement current through one of the capacitors, and then of galvanic current through one of the resistors. Since the capacitors are relatively small, the power factor can be greater than 0.7 as required for US consumer Energy Star compliance.

Other features and advantages of the present invention will become apparent from the following description of the invention that refers to the accompanying drawings.

BRIEF DESCRIPTION OF THE DRAWINGS

FIG. 16 shows the input and output current waveforms of the fourth embodiment and also displays the results for the efficiency and power factor.

DETAILED DESCRIPTION OF THE INVENTION

As described above, conventional arrangements for driving LEDs directly from an AC power line may utilize switches to short out appropriate numbers of LEDs so that the voltage being applied from the power line at every instant in time roughly matches the requirements of the non-shorted elements of the LED array. In accordance with the various embodiments of the present invention as will be described in detail below, an alternative approach is proposed, where the LEDs are disposed in series as a single "string", and the AC power is initially fed to a fraction of the LEDs (defined as one or more "substrings") using displacement current though a capacitor (hereinafter referred to as "capacitively-limited current"). Then, once the power line voltage is high enough, a larger number of LEDs is driven directly from the power line with a resistive type of current limiting element.

Although only a single capacitor is depicted in each of the embodiments to drive one subsection of an LED string, it is to be understood that the principles of the invention could be extended to use multiple capacitors driving corresponding multiple subsections of the LED string in succession.

Figure 1:
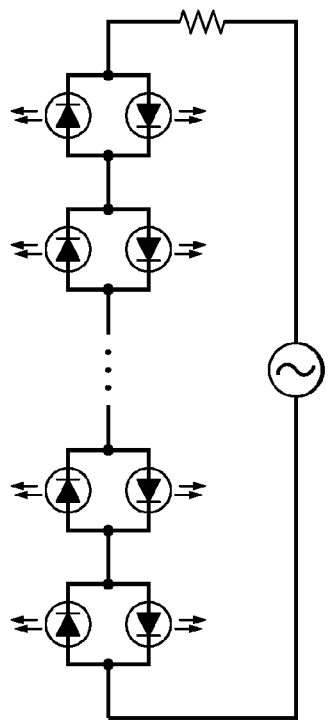
FIG. 1 is a simplified schematic of a prior art light engine in which a resistor is used to limit the current flowing through a string of bidirectional LEDs connected to the AC power line.
Figure 2:
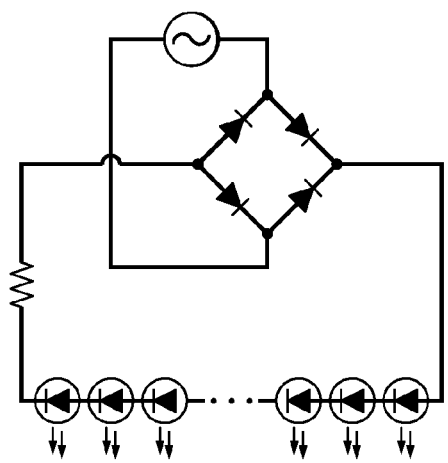
FIG. 2 is a simplified schematic of a prior art light engine in which a resistor is used to limit the current through a unidirectional string of LEDs connected to a full bridge rectified AC power line.
Figure 3:
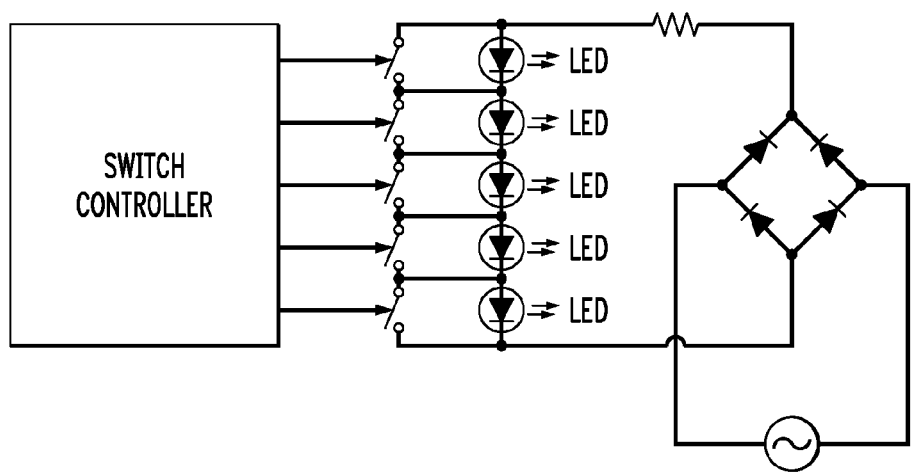
FIG. 3 is a simplified schematic of a prior art light engine in which the AC power line is rectified and fed to a string of unidirectional LEDs which have an array of switches connected so that the number of LEDs connected to the power line can be continuously adjusted to match the power line voltage during the power line cycle.
Figure 4:
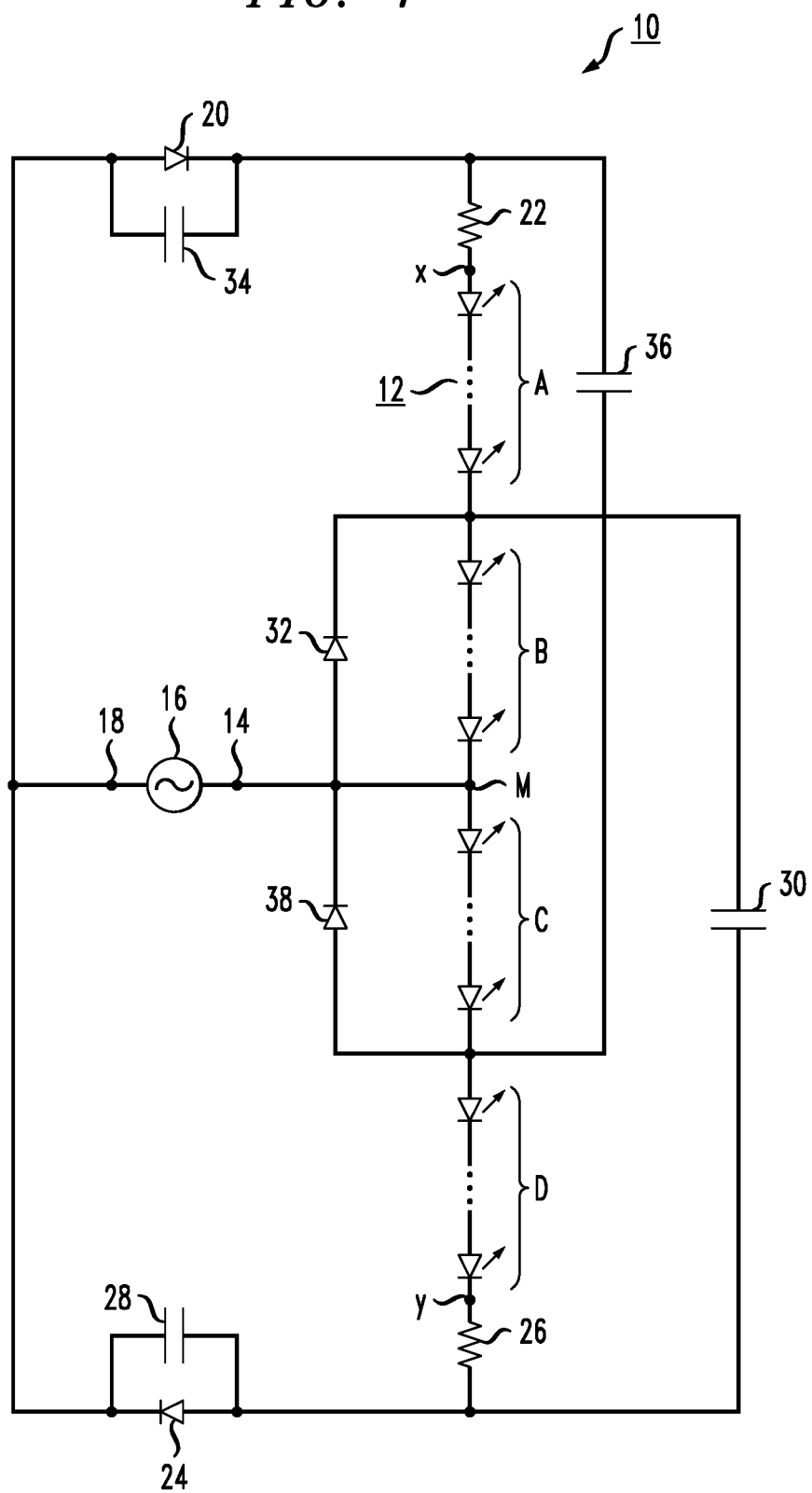
FIG. 4 is a schematic of a first embodiment of the present invention.

A first embodiment of an AC-driven LED light engine 10 of the invention is depicted in FIG. 4. In this embodiment, a plurality of individual LEDs 12 are all connected in series in one continuous string. For purposes of operation, the string itself is subdivided into four substrings, shown as A, B, C and D in FIG. 4. Although it is convenient for manufacturing purposes for each substring to have the same number of individual LEDs, there may be some circumstances where it is advantageous to use different numbers of LEDs in each substring. In its most general form, LED light engine 10 can be configured to have any suitable number of separate LEDs within each substring.

Indeed, in this and all other embodiments the number of LEDs used in a substring will depend on the forward voltage of the specific LED devices being used, as well as the intended power line voltage (for US consumer applications, generally a 120V power line). By way of example only, the exemplary substrings of LEDs 12 as shown in FIG. 4 may each include twenty-one individual LEDs (typical when utilizing commonplace white LEDs with a 120V power line).

As shown in FIG. 4, the connection between substrings B and C (denoted as midpoint M) is connected to a first termination 14 of an AC power line 16, with the two opposing ends of the string (these opposing ends designated as X and Y in FIG. 4) connected to the second, opposing termination 18 of power line 16. In particular, a first end X of the string is connected to termination 18 through a series combination of a diode 20 and a resistor 22, and a second end Y of the string is connected to termination 18 through a series combination of a diode 24 and a resistor 26.

In accordance with this first embodiment of the present invention, a first capacitor 28 is disposed across diode 24 and used to apply the changing positive power line half-cycle voltage across a bias capacitor 30 so that current is conducted through substring B of LEDs 12, and then back to power line terminal 14. For the purposes of the present invention, the term "bias capacitor" is intended to describe the pair of capacitors utilized in each embodiment to control (i.e., limit) the capacitively-limited current (displacement current) that flows through the LEDs at certain points in each power line half cycle. The bias capacitors are characterized by the property that they operate as a pair, each associated with a half cycle of the voltage such that, in general, one is discharging while the other is charging.

Returning to the description of the embodiment of FIG. 4, during the changing negative power line voltage half cycles, a diode 32 is shown and functions to reset bias capacitor 30 during the negative power line voltage half cycle so that bias capacitor is "ready" for the next half cycle. For the negative power line voltage half cycles, a capacitor 34 disposed across diode 20 has a complementary function to capacitor 28, while a bias capacitor 36 has a complementary function to bias capacitor 30 (in this case, conducting current through substring C). Similarly, a diode 38 has a complementary function when compared to diode 32. The collection of capacitors 28, 30, 34 and 36 act together to constitute a capacitive means that shapes a distinctive capacitively controlled hump in the LED output current waveform.

At the peak of the positive power line half cycle, resistively-limited current flows directly from the power line, through diode 20 and resistor 22, along substrings A and B of LEDs 12, and then back to the power line terminal 14. This is characterized as "galvanic" or "resistively-limited" current, as opposed to the so-called "displacement" or "capacitively-limited" current that flows through LEDs 12 at other points in the power line cycle. During the peak of the negative power line voltage half cycle, galvanic current flows from power line terminal 14 through substrings C and D of LEDs 12, through resistor 26 and then through diode 24 back to power line terminal 18.

It is to be understood that resistors 22 and 26 could be replaced, for example, by a single resistor placed between midpoint M of LED sub strings B and C and the connection of diodes 32 and 38, or by a single resistor disposed between the connection of diodes 32 and 38 and the AC power line 16. Resistors 22 and 26 could also be distributed throughout the LED substrings and those skilled in the art will see numerous other ways to implement this resistive means for providing a functionality to control the resistive-limited current.

Figure 5:
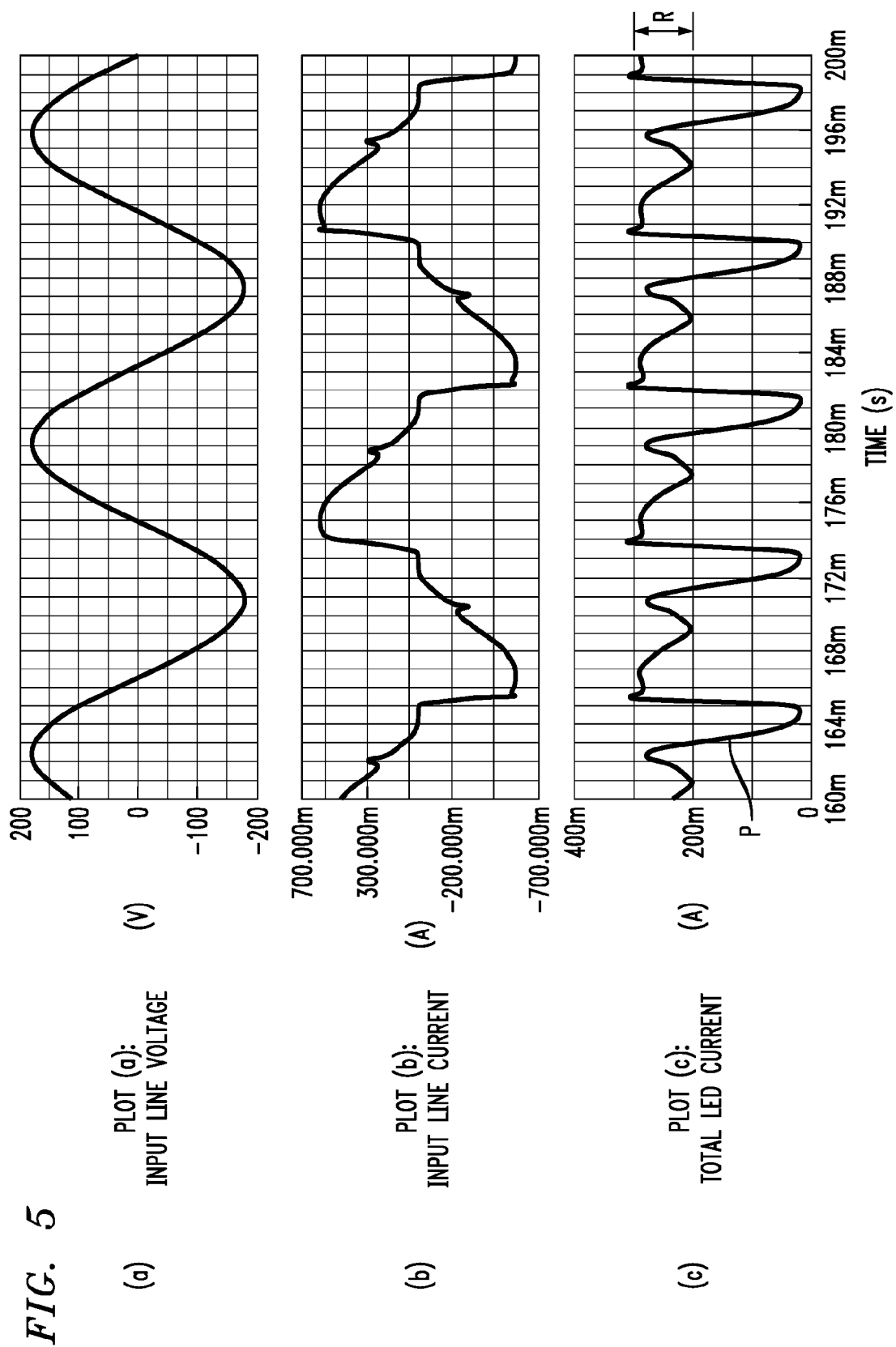
FIG. 5 shows a comparison of the applied AC line voltage to the input line current and the total LED current through all four LED substrings for the first embodiment.

While the above explanation serves to describe the basic operation of the present invention, there are certain advantages and features of the operation which lead to a relatively uniform total LED current with only very narrow gaps of no conduction. These advantages are explained in association with the signal plots shown in FIG. 5. In particular, plot (a) in FIG. 5 shows the waveform of the typical AC input line voltage and plot (b) depicts the associated input line current. The summed current through all four substrings A-D of LEDs 12 (i.e., the total LED current), is shown in plot (c). Since LED light output (illumination) is proportional to the LED current at low current densities, this summed current is accurately representative of the illumination if all four substrings are identical. It can be seen that the summed LED current is confined to a relatively narrow range R between 200 mA and 300 mA, except for a sharp, brief 1.5 msec period P every half cycle. The human eye cannot perceive such rapid fluctuations and simply perceives this light output as being smooth and continuous.

A unique feature of this exemplary embodiment of the present invention is that the reason the gap between half cycles is so short is because the LED current corresponding to the "next" power line voltage half cycle commences about half way through the descent portion of the "present" voltage half cycle. This overlap in powering different substrings, in accordance with the present invention, is the result of bias capacitor 30 being discharged during the positive voltage half cycle (where bias capacitor 30 will be recharged during the subsequent negative voltage half cycle). Similarly, bias capacitor 36 is discharged during each negative voltage half cycle and then recharged during the subsequent positive voltage half cycle. Thus, once a positive voltage half cycle starts declining, bias capacitor 36 is fully charged and starts delivering current which will flow through substring C during the negative voltage half cycle. Once a negative voltage half cycle starts declining, capacitor 30 (which is now fully charged) starts delivering current which will flow through substring B during the positive voltage half cycle.

Figure 6:
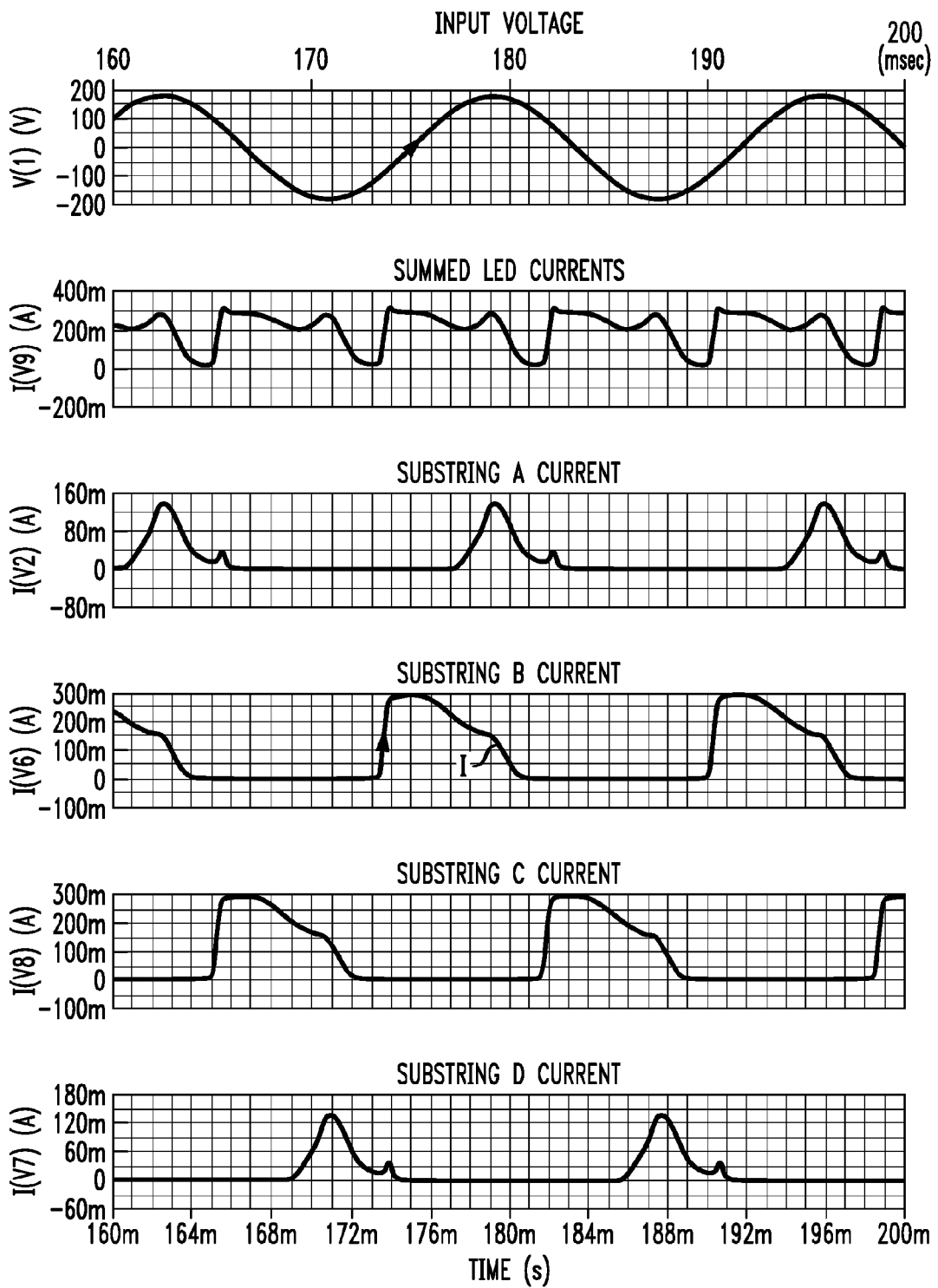
FIG. 6 shows a comparison of the applied AC line voltage with the summed current through all the LED substrings and the individual current through each of the four LED substrings for the first embodiment.

In FIG. 6 the summed (i.e., total) LED current is plotted out for comparison with the input line power voltage. The plots of the LED current passing through each individual substring A-D are also contained in FIG. 6. As shown, as the positive line power voltage half cycle starts to rise, the current through substring B of LEDs 12 rises abruptly and then steadily declines (with reference, for example to the current through substring B at 172 msec). There is an inflection in the declining curve, shown at point I, where the line voltage peak is sufficiently high to turn on substring A of LEDs 12. Although the current through substring B of LEDs 12 continues to decline, the rising current through substring A means that the summed LED current remains between 200 mA and 300 mA. By virtue of the symmetry of this configuration, the same current flows through substrings C and D occur during a negative line power voltage half cycle time period.

Figure 7:
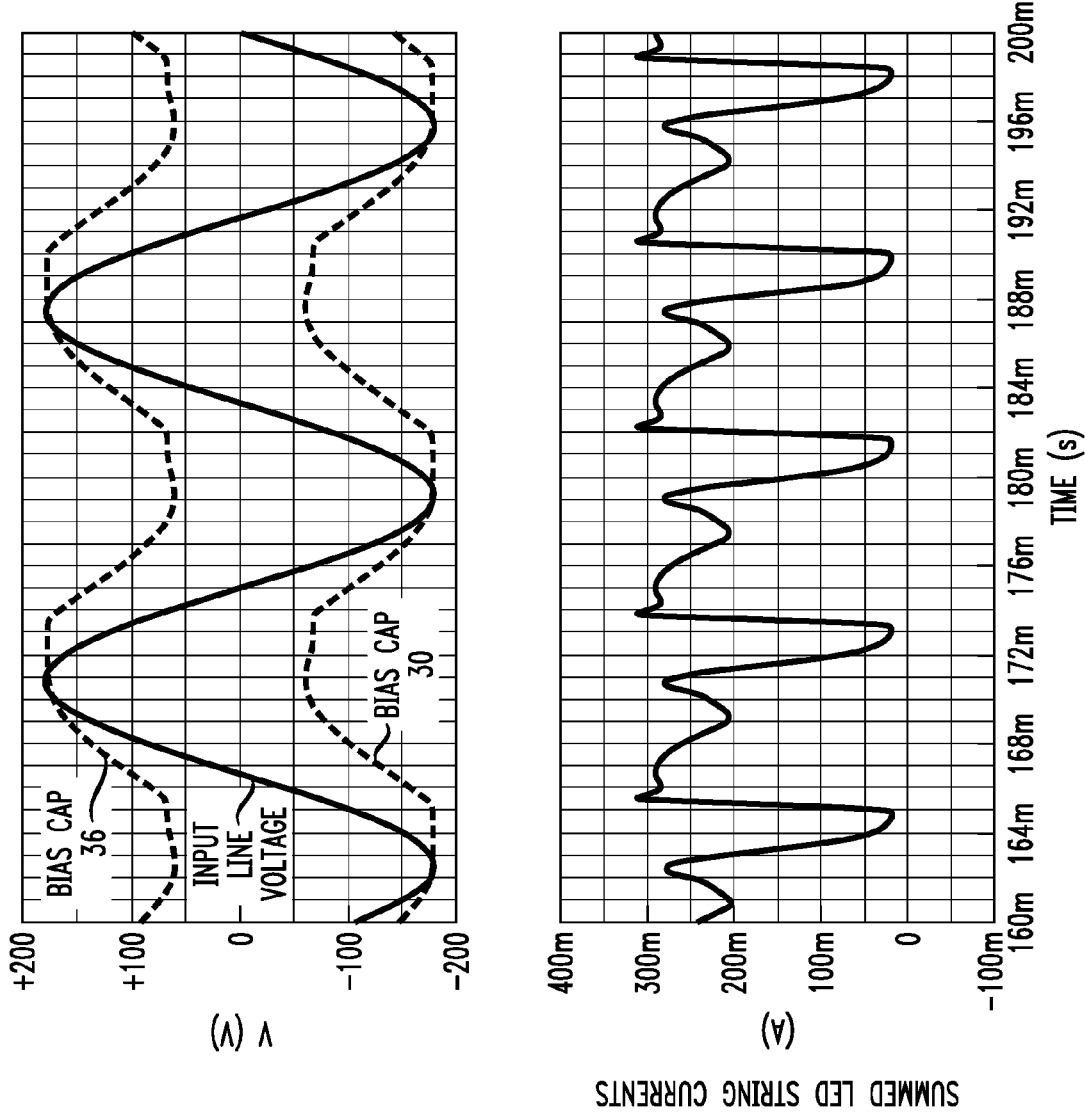
FIG. 7 shows a comparison of the input line voltage with the summed LED string currents and the voltage across each of the bias capacitors utilized in the first embodiment.

To explain the sharp rise in LED current once the power line voltage starts to decline from its peak, it is helpful to look at FIG. 7. Here, the voltage waveforms across bias capacitors 36 and 30 are plotted out for comparison with the AC line voltage, with a plot of the summed LED currents also shown in FIG. 7. During the positive half cycle, bias capacitor 36 has become charged to roughly 180V, equal to the peak of the line voltage. Each of the LED substrings requires about 73V to be activated. Therefore, when the power line voltage peak starts to decline, the declining voltage is conveyed to a first terminal of bias capacitor 36 by capacitor 34, causing the anode of diode 38 to be pulled to a more negative voltage, turning on substring C of LEDs 12. Since bias capacitor 36 is fully charged, any additional decline in the line voltage peak results in the application of more voltage across substring C. This results in the LED current rising very sharply, making the interval between conduction periods only about 1.5 msecs. The sharp rise and fall times of these currents, therefore, is controlled by the presence of capacitors 28 and 34. Prior art LED light engines, such as those mentioned above, used simple resistor and capacitor circuits and as a result were only able to achieve a 3 msec gap between current pulses, since these circuits did not charge one bias capacitor while the other bias capacitor was being discharged.

Exemplary Embodiment

In order to demonstrate the first embodiment of the invention the following component values were used, although clearly many variations of these values are possible within the spirit of the invention. The LED substrings contained 21 white LEDs. Capacitor 36 and capacitor 30 were 10 µF each. Capacitors 34 and 28 were 7.5 g. The rectifying diodes were MUR140 types. Resistors 22 and 26 were 56Ω. The power factor of this embodiment was 0.45.

Figure 8:
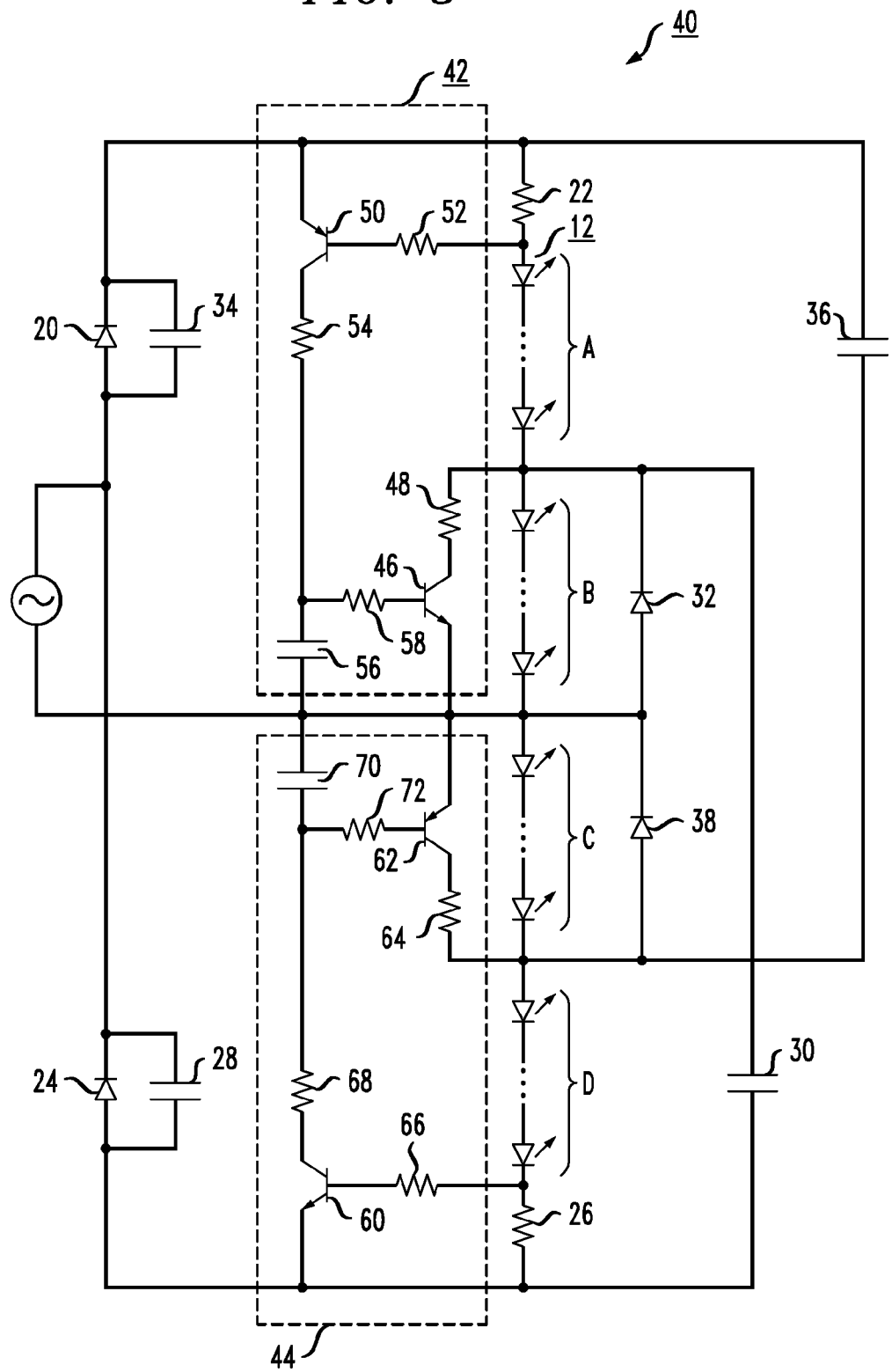
FIG. 8 shows a schematic of a second embodiment of the invention which employs solid state switches to ensure continuous light output and improved power factor.

A second embodiment of the invention is depicted in FIG. 8 as an LED light engine 40. Those components of LED engine 40 that provide the same functionality as LED engine 10 of FIG. 4 are shown by the same reference numeral. What is different in this particular embodiment is the inclusion of a pair of current-triggered switches that are placed across substrings B and C of LEDs 12 and are used to "short out" these substrings during the resistive-limited current portion of each half cycle. A first current-triggered switch 42 is disposed across substring B and is activated to bypass substring B by when the current through resistor 22 reaches its peak (positive) value. Similarly, a second current-triggered switch 44 is disposed across substring C and is activated to bypass substring C when the current through resistor 26 reaches its peak (negative) value. In this embodiment, therefore, substrings A and D are primarily used to supply LED current in the peak regions of the AC power line input, with substrings B and C used to supply LED current in the transition times between the peaks in the AC voltage cycle.

Referring now to FIG. 8 in detail, first current-triggered switch 42 comprises an NPN transistor 46 in series with a current-limiting resistor 48 across substring B. NPN transistor 46 is turned on when the current through resistor 22 produces a voltage sufficient to extract a base current from a series combination of an associated PNP transistor 50 and resistor 52. When the current through resistor 22 is large enough, PNP transistor 50 is activated and sends a drain current through a resistor 54, which will then begin to charge a capacitor 56. After an RC time delay determined by the combination of resistor 54 and capacitor 56, capacitor 56 becomes sufficiently charged to drive a base current into NPN transistor 46 through a resistor 58, turning on NPN transistor 46 and shorting out LED substring B. As a result, NPN transistor 46 then pulls drain current through resistor 48, thereby increasing the current through resistor 22, which started the whole process.

The end result is that transistors 46 and 50 become latched "on" in a regenerative process until the power line voltage becomes less than the forward voltage across substring A of LEDs 12 (i.e., towards the end of the positive half-cycle of the AC power line voltage). Prior to this threshold-crossing in the cyclic AC power line voltage, substring C of LEDs 12 has already commenced operation (in response to displacement current through bias capacitor 36, described above), thus ensuring an overlap between the light outputs from the two substrings B and C. That is, by virtue of using both a galvanic (resistively-created) current and a displacement (capacitively-created) current, there is no perceptible gap in the application of energy to the LEDs.

An exactly complementary process takes place within second current-triggered switch 44 during the negative half cycles along the AC power line, with a pair of transistors 60 and 62 latching "on" to short out substring C of LEDs 12 later in the cycle. In particular, second current-triggered switch 44 includes a series combination of PNP transistor 62 and a current-limiting resistor 64 disposed across substring C. PNP transistor 62 will turn on when the current through resistor 26 produces a voltage sufficient to extract a base current through a combination of NPN transistor 60 and a resistor 66. That is, when the current through resistor 26 is large enough to activate NPN transistor 60, the current flowing through transistor 60 will pass through a resistor 68 and begin to charge a capacitor 70. The RC delay associated with the combination of resistor 68 and capacitor 70 thus determines the time when capacitor 70 becomes sufficient charged to drive a base current into PNP transistor 62 through a resistor 72, turning on PNP transistor 62 and bypassing substring C. Thus, PNP transistor 62 pulls current through resistor 64 and thereafter increases the current through resistor 26. As with first switch 42, this action of second switch 44 results in transistors 60 and 62 becoming latched "on" in a regenerative process until the magnitude of the power line voltage becomes less than the forward voltage across substring D of LEDs 12.

Figure 9:
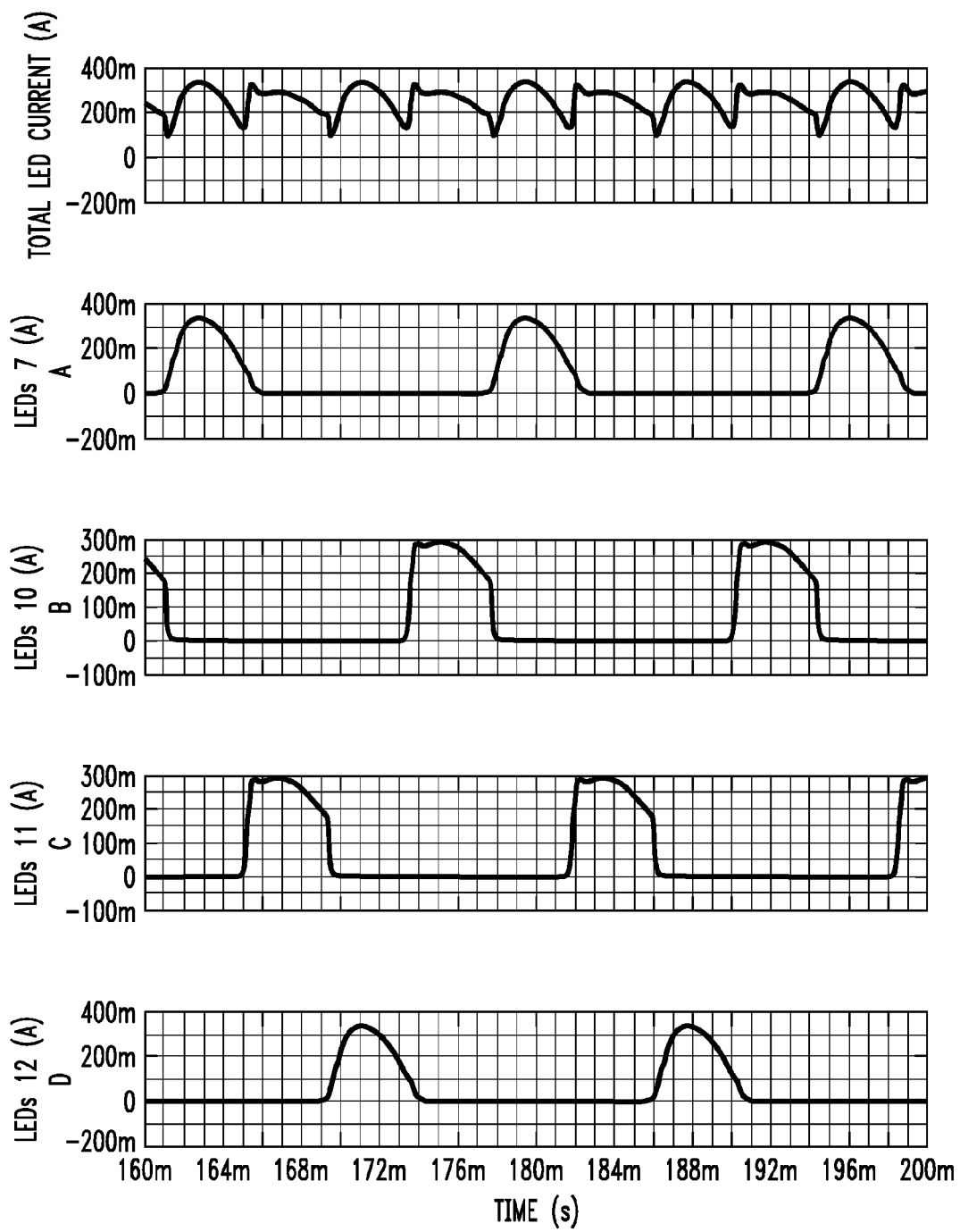
FIG. 9 shows the comparison of the applied AC line voltage with the summed current through all the LED strings and the individual current through each of the four substrings for the second embodiment as shown in FIG. 8.
Figure 10:
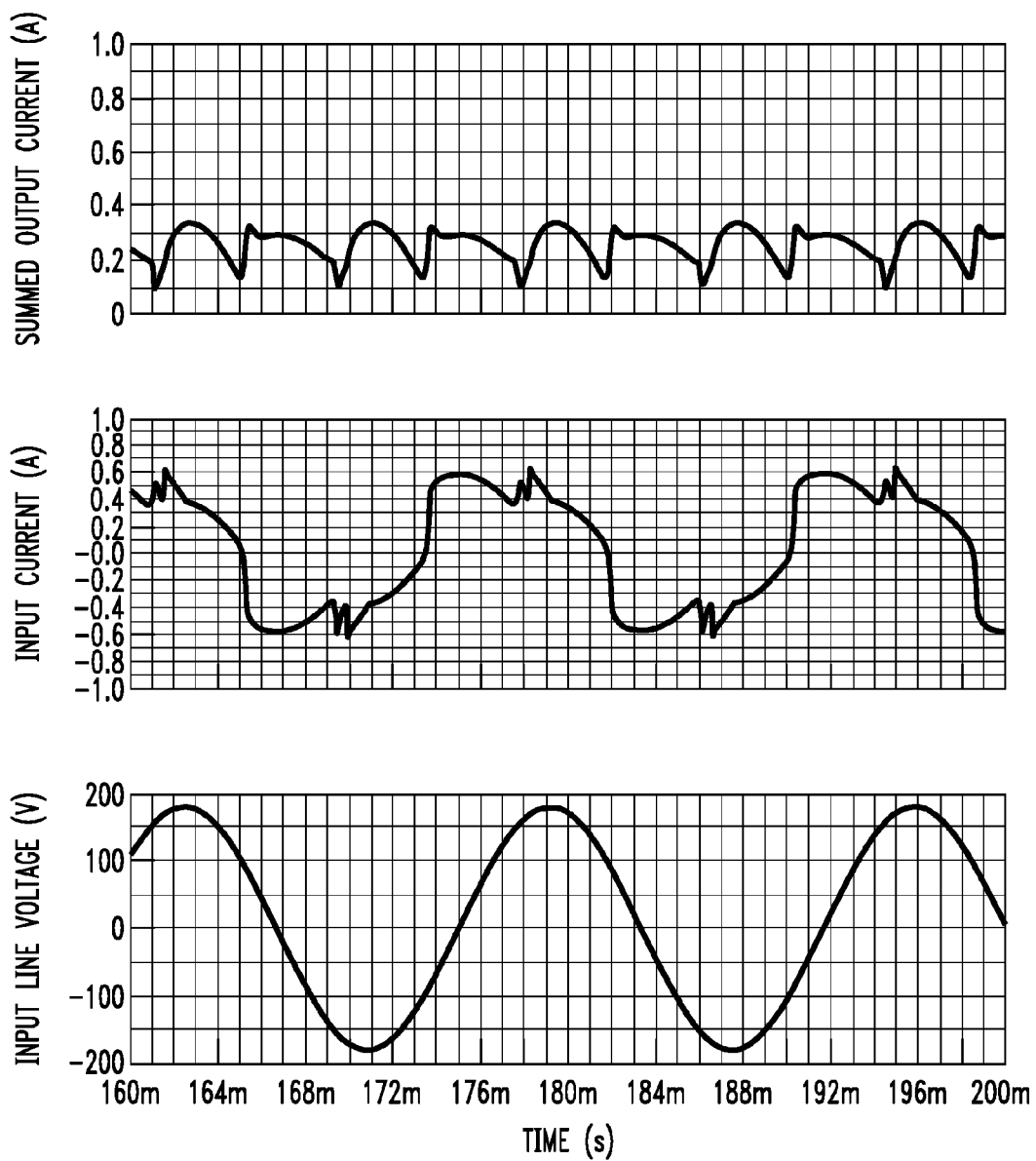
FIG. 10 shows a comparison of the applied AC line voltage to the input line current and the total LED current through all four substrings for the second embodiment.

FIG. 9 shows the total LED current for LED light engine 40 of FIG. 8, provided for the sake of comparison with the current through each of the four substrings A-D. It can be seen that the current pulses associated with separate pairs of substrings overlap, in accordance with the inventive use of both resistive (galvanic) and capacitive (displacement) current. Therefore, as shown in the graph of the total LED current, the average total LED current is about 300 mA, and the lowest total LED current is 100 mA (which is only approached very briefly for 1.5 msecs at a time). In FIG. 10, the input current and total LED current for LED light engine 40 are shown in comparison with the input AC line voltage. It can be seen that for the configuration of LED light engine 40 of FIG. 8, the input current is more nearly in phase with the input line voltage than was the case with the first embodiment (LED engine 10, FIG. 4), as reviewed in comparison with the diagram of FIG. 5. Thus, the power factor is improved for this configuration with respect to that of FIG. 4. Additionally, it is clear that the input line current waveform as shown in FIG. 10 is closer to a sine wave (although still somewhat distorted) than the input line current waveform associated with LED engine 10 as shown in FIG. 5.

Exemplary Embodiment

In order to demonstrate the second embodiment of the invention the following component values were used, although clearly many variations of these values are possible within the spirit of the invention. The four LED substrings each comprised twenty-one white LEDs. Bias capacitors 30 and 36 were each 10 g. Capacitors 28 and 34 were each 7.7 g. Capacitors 56 and 70 were 1.0 g. Diodes 20, 24, 32 and 38 were type MUR140. NPN transistors 46 and 60 were type BUW40. PNP transistors 50 and 62 were type RCA30C. Resistors 52, 58, 66 and 72 were 470Ω. Resistors 22 and 26 were 75Ω. Resistors 54 and 68 were 4.7K Ω. Resistors 48 and 64 were 300Ω. The power factor of this embodiment was 0.62.

Figure 11:
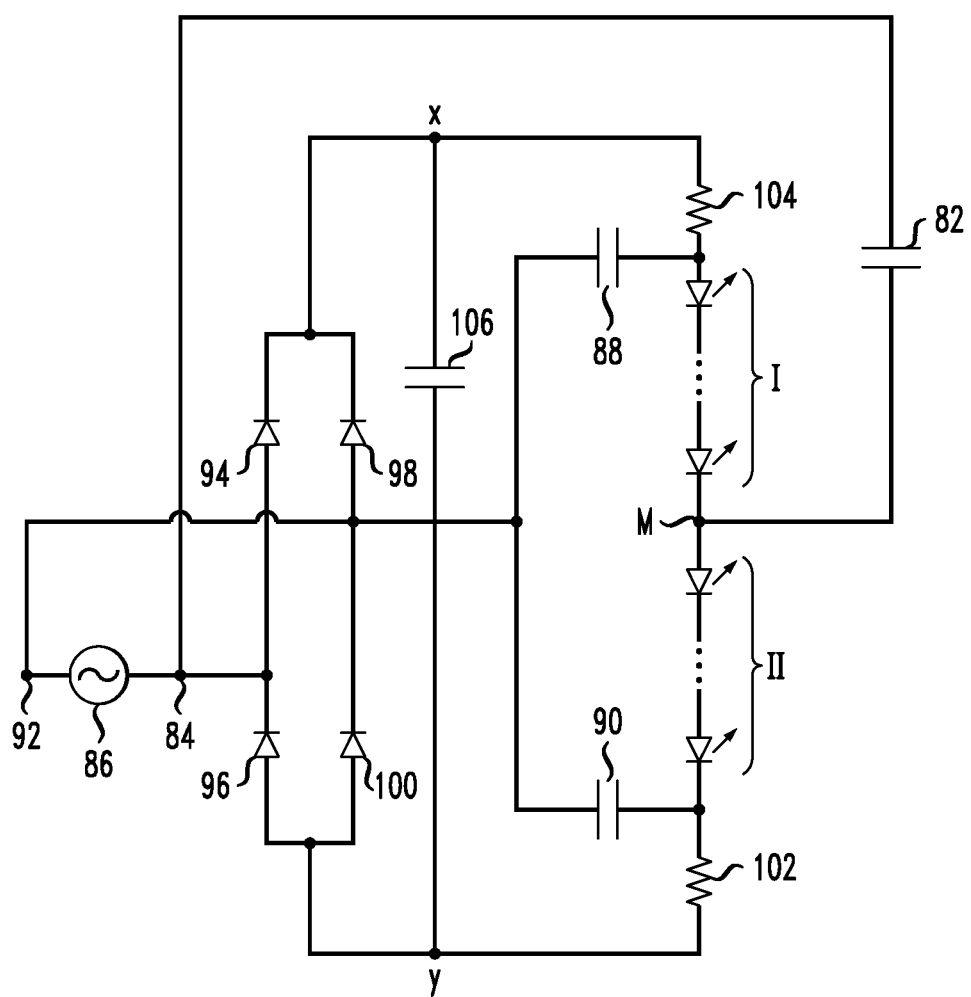
FIG. 11 shows a schematic of a third embodiment of the invention which is cost reduced by using a full bridge rectifier to reduce the number of LEDs used.

A third embodiment of the invention is shown as LED light engine 80 in FIG. 11. In this configuration, light engine 80 utilizes only a pair of LED substrings, denoted as substrings I and II in FIG. 11. At their midpoint M, a capacitor 82 is connected directly to a first terminal 84 of a power line connector 86. A pair of bias capacitors 88 and 90 is used to conduct displacement current directly back to an opposing terminal 92 of power line connector 86. These capacitors, together with capacitor 82, constitute the capacitive means responsible for producing the distinctive hump associated with displacement current in the output current waveform, as particularly shown in FIG. 12.

A set of diodes 94, 96, 98 and 100 comprises a full bridge rectifier arrangement that provides rectified power to the opposing ends of substrings I and II through resistors 102 and 104, respectively. In particular, resistors 102 and 104 constitute the resistive means for driving the LEDs. It is to be remembered, as mentioned before, that various arrangements may be used to provide this resistive means, which various configurations are considered to be well known to those skilled in the art. An additional capacitor 106 is disposed between terminals X and Y, and is used to smooth the output voltage from the bridge rectifier.

Figure 12:
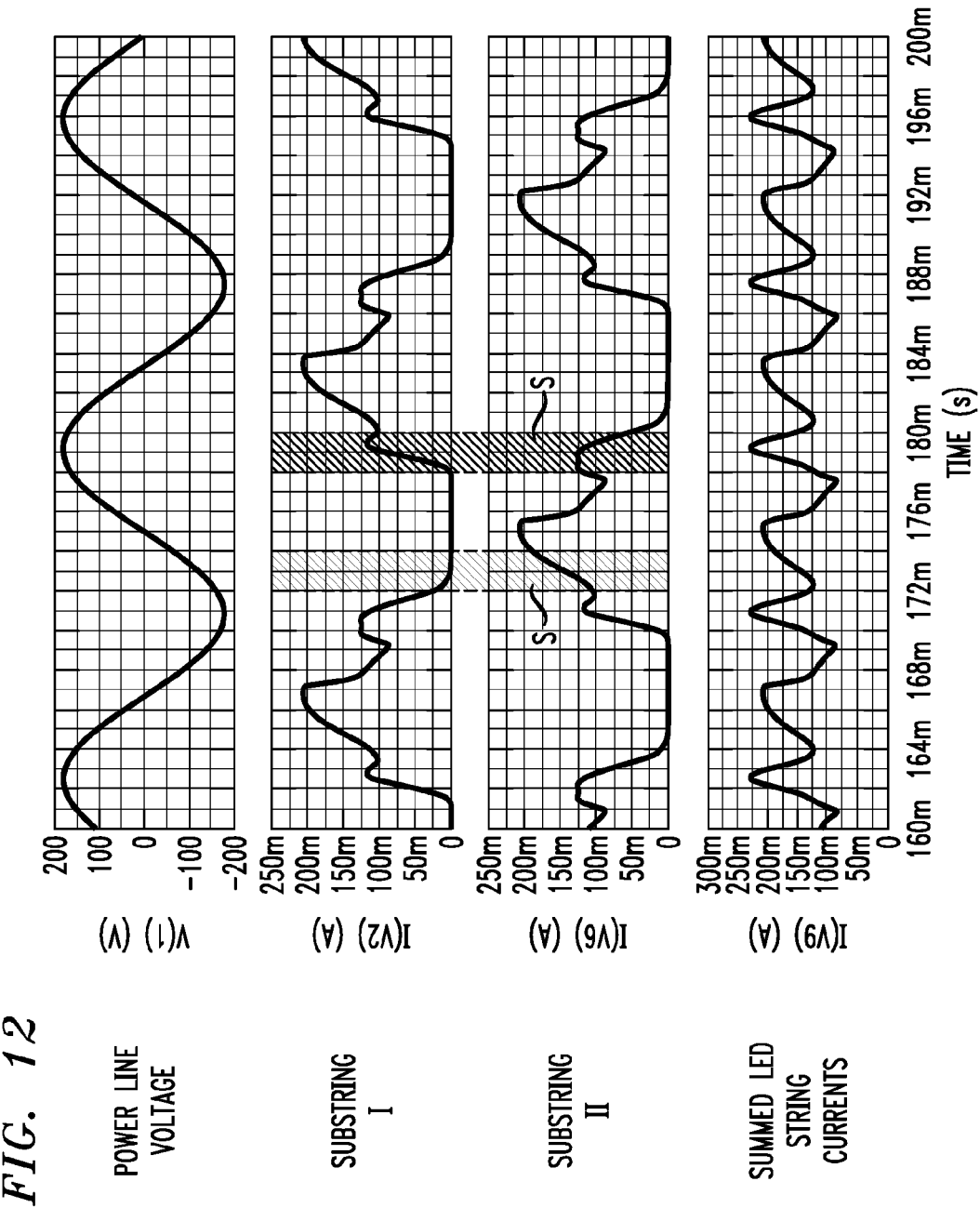
FIG. 12 shows the comparison of the applied AC line voltage with the individual currents and the summed currents through both of the LED substrings for the third embodiment of FIG. 11.
Figure 13:
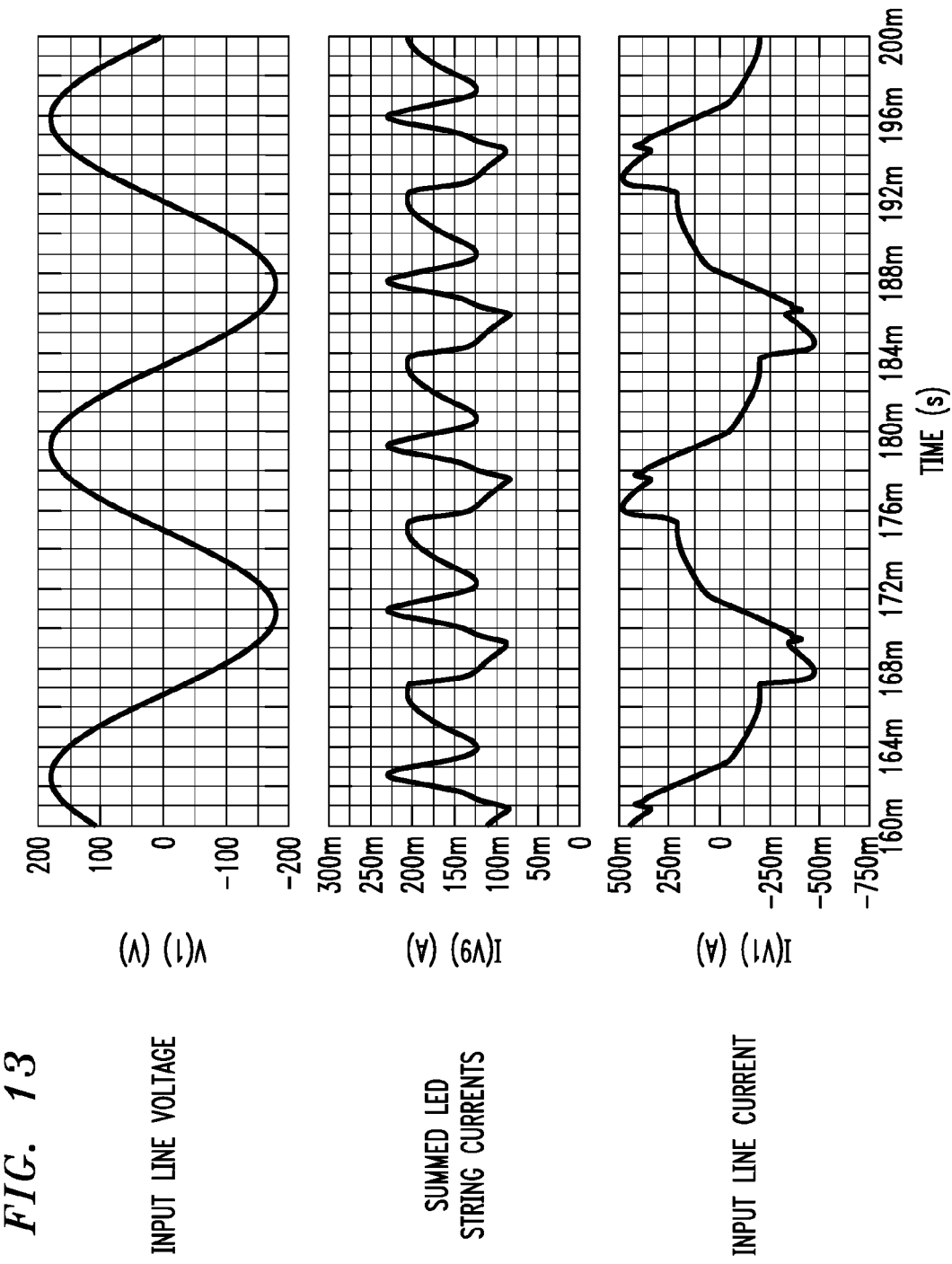
FIG. 13 shows a comparison of the applied AC line voltage to the input line current and the total LED current through both LED substrings for the third embodiment.

FIG. 12 is associated with LED light engine 80 and shows the current through each substring I and II individually, as well as the summed LED current. All of these are shown in comparison with the AC power line voltage. It can be seen that the currents from substrings I and II overlap each other, shown in the shaded regions S of FIG. 12, so that the summed string current is continuous throughout the line voltage cycle. As a result of this overlap, the ripple current present on the summed string current is primarily fluctuating at a frequency of 240 Hz and above, which is imperceptible to the human eye. Since this embodiment requires only half the number of LEDs as the other two embodiments discussed thus, it is especially cost effective (the reduction in the number of LEDs attributed to the use of the rectifier). In FIG. 13, the input power line current is shown by comparison with the power line voltage and the summed output LED string currents. It can be seen that the input current of LED light engine 80, as shown in FIG. 13, is of a generally sinusoidal nature.

Exemplary Embodiment

In order to demonstrate the third embodiment of the invention the following component values were used, although clearly many variations of these values are possible within the spirit of the invention. The two LED substrings (I and II) each comprised twenty-one white LEDs, capacitors 88 and 90 were each 4.7 g, capacitor 82 was 5.6 g, resistors 102 and 104 were 36Ω, capacitor 106 was 3.3 g and diodes 94, 96, 98 and 100 were type MUR160. The power factor of this embodiment was 0.45 (the reduction in power factor when compared to the second embodiment primarily the result of the phase mismatch between the input line voltage and the input line current).

Figure 14:
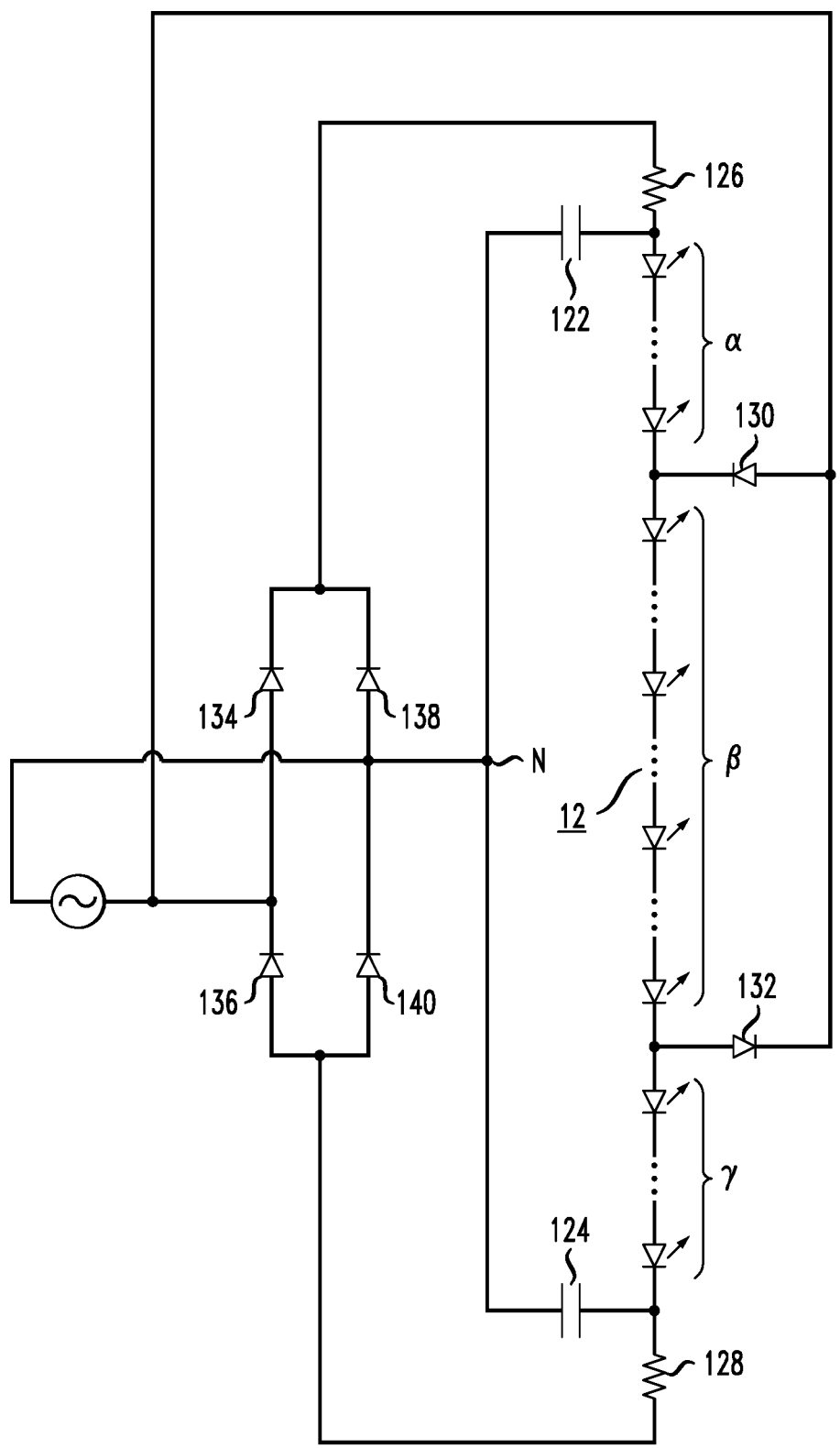
FIG. 14 shows a schematic of a fourth embodiment of the invention, which is cost effective since it uses a full bridge rectifier and only uses relatively small capacitors so that the power factor can be greater than 0.7.

A fourth embodiment of the invention, denoted as LED light engine 120, is shown in FIG. 14. This embodiment provides a relatively low-cost configuration, requiring only between fifty and sixty total LEDs, with efficiency on the order of 90% and a power factor greater than 0.7 (as is required for example, for Energy Star qualification in the United States). Although at first glance LED light engine 120 may appear to be different from the embodiments described above, a pair of bias capacitors 122 and 124 performs the same function (i.e., energy storage) as bias capacitors 36 and 30 of light engines 10 and 40, and bias capacitors 88 and 90 in light engine 80. Similar to the other embodiments, these capacitors comprise the capacitive means that produce the distinctive capacitively-limited current hump in the output current waveform. Resistors 126 and 128 perform the same current-limiting function as, for example, resistors 22 and 26 in LED light engine 10 of FIG. 4, and constitute the resistive means as described hereinabove with the other embodiments of the present invention.

In accordance with this embodiment of the present invention, a pair of diodes 130 and 132 is used to initially activate only a fraction of the LEDs 12 (in this embodiment, LEDs 12 are depicted as a set of three substrings, denoted α, β and γ). A node N between bias capacitors 122 and 124 is used for purposes of explanation as a reference or common node, relative to which voltages in the circuit are judged to be either positive or negative. Also shown in this embodiment is a bridge rectifier formed of a set of diodes 134, 136, 138 and 140. As input AC voltage rises at the connection of diodes 134 and 136, bias capacitor 122 becomes positively charged (through diode 134 and resistor 126). It is to be noted that bias capacitor 124 was earlier charged negatively during a previous half cycle. Therefore, as soon as a slightly positive voltage appears on the cathode of diode 130, current will begin to flow through LED substrings β and γ, thus discharging bias capacitor 124. Eventually, as bias capacitor 124 becomes discharged, the incoming line voltage has risen to a sufficient extent that current can now pass through diode 130 and LED substrings β and γ, and thereafter through resistor 128 back into the power line through diode 136.

On the subsequent line voltage half cycle, in which the voltage on the center point of diodes 134 and 136 is falling, as soon as the voltage on the anode of diode 132 starts to go negative, the voltage which is already stored on bias capacitor 122 will drive displacement current through LED substrings α and β. As before, at the point where bias capacitor 122 is almost completely discharged, galvanic (i.e., resistively-limited) current continues to flow through resistor 126 to energize LED substrings α and β.

Figure 15:
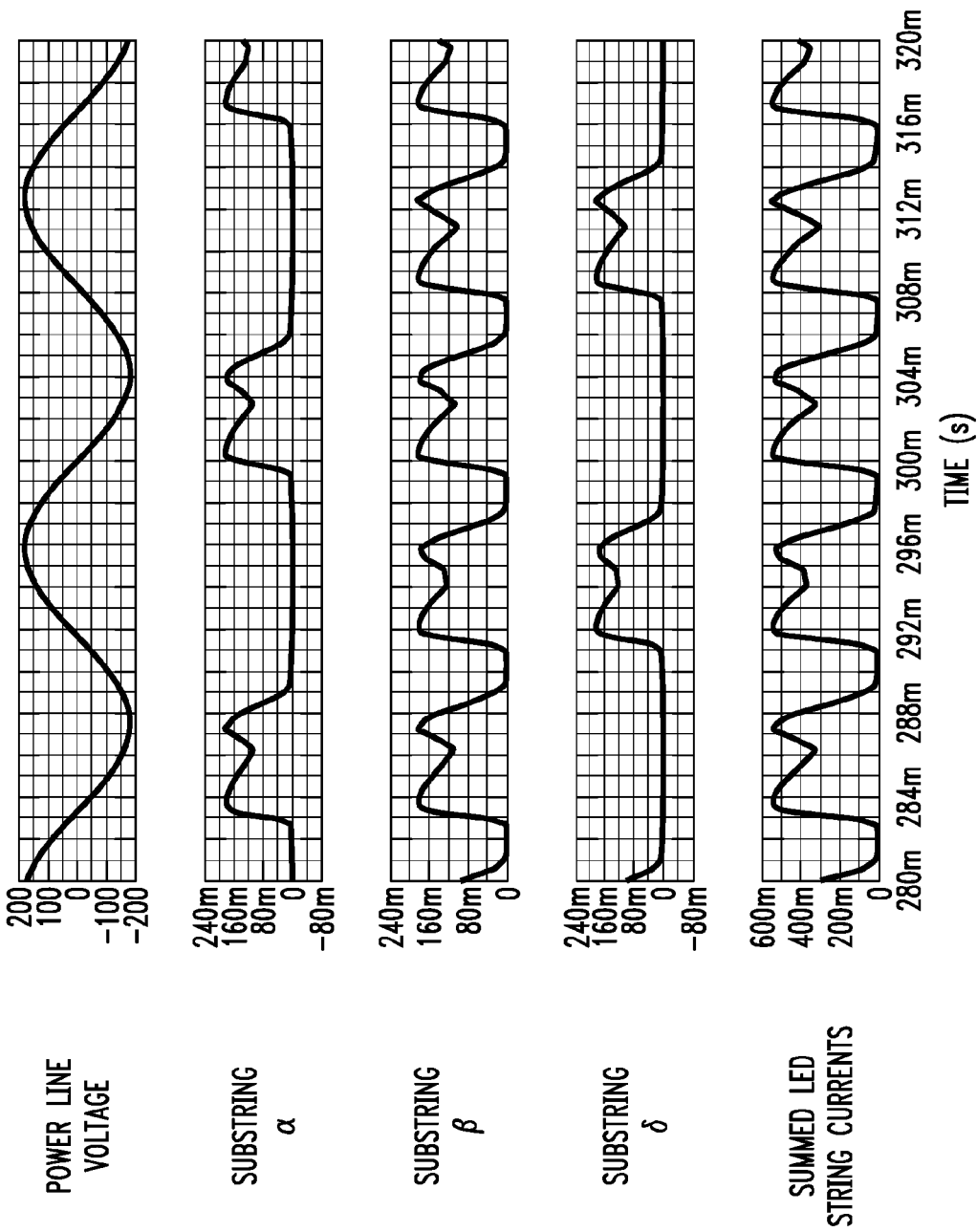
FIG. 15 shows the LED current through the individual LED substrings of the fourth embodiment, compared with the AC line voltage.

FIG. 15 shows the current through each of the LED substrings during a power line cycle. Each pulse of LED current shows the two distinctive halves: a first half in which the current is capacitively limited (displacement current) and then a second half in which the current is resistively limited (galvanic current). The summed LED current waveform shown in FIG. 15 exhibits the same, distinctive two-hump pattern as is present in the total LED current waveform of FIG. 5, confirming that the same basic mechanism is at work. FIG. 16 shows the input line current by comparison with the input line voltage. Since the input line current now changes polarity closer to the line voltage zero crossing than in the previous embodiments, the power factor is relatively higher, approximately 0.71, compared to the earlier embodiments.

Exemplary Embodiment

In order to demonstrate the fourth embodiment, a prototype used the following components: The LEDs were a total of fifty-two white LEDs, with substrings α and γ each having thirteen individual LEDs. All the rectifier diodes were type MUR160, although almost any diode with sufficient voltage and current capability could have served the purpose. Bias capacitors 122 and 124 were 2.7 µF and resistors 126 and 128 were 100Ω each. With 120V applied, LED light engine 120 had an input power of 17.5 W, with a power factor of 0.71. The electrical efficiency was 90%. This circuit is particularly attractive for general purpose use because of the low cost of the components, as well as exhibiting a power factor greater than 0.7, the latter making it acceptable for Energy Star consumer purposes.

Although the present invention has been described in relation to particular embodiments thereof, many other variations and modifications and other uses will become apparent to those skilled in the art. It is anticipated that numerous other topologies can be created using the same basic principles. The rectifying diodes used could be Schottky diodes or bipolar diodes. Any of the rectifying diodes could be made out of LED strings, as well as bipolar or Schottky diodes. The switches described could be made using MOSFETs, SCRs, IGBTs or any of the numerous solid state switches known to those skilled in the art. The detailed switch triggering mechanism used could be embodied in numerous ways. The embodiments shown were optimized for more constant LED current, however by trivial modification of the circuit parameters they could also be modified to give better power factor and THD at the expense of the uniformity of the LED current. Where LEDs are described as being connected anode to cathode, it is well known to those skilled in the art that in each case one LED could be replaced by a parallel connection of two or more LEDs having the same orientation, so that if one LED fails then the other can still conduct current and provide light in order to enhance the reliability of the assembly. The resistors described could be replaced by constant current diodes or other constant current circuits, combined if necessary with bypass diodes. Alternatively, the resistors could be distributed in different parts of the circuit; for example, in combination with the LEDs or the rectifying diodes.

It is preferred therefore, that the present invention be limited not by the specific disclosure herein, but only by the appended claims.

What is claimed is:

1. A driverless LED light engine comprising:
   a plurality of single LED devices connected in series to form an LED string, with the string defined as including a plurality of LED substrings connected anode to cathode and connected to the ac power line; and
   a plurality of resistors and at least two separate bias capacitors coupled between the ac power line and selected LED substrings such that during each ac power line half cycle two distinct types of LED current peaks are present, one type of LED current peak being capacitively-limited displacement current attributed to one of the at least two separate bias capacitors, and another type of LED current peak being galvanic current passing through at least one of the plurality of the resistors.

2. The driverless LED light engine as defined in claim 1 wherein the light engine further comprises a bridge rectifier as the means of connecting the ac power line to the resistors.

3. The driverless LED light engine as defined in claim 1 wherein the specific values of the plurality of resistors and the at least two separate bias capacitors are selected such that the peak amplitudes of said galvanic current and said displacement current are approximately the same.

* * * * *